(12) United States Patent
Chen et al.

(10) Patent No.: US 9,818,556 B2
(45) Date of Patent: Nov. 14, 2017

(54) WATERPROOF STRUCTURE FOR BUTTON OF ELECTRONIC PRODUCT AND WATERPROOF MOBILE PHONE USING THE SAME

(71) Applicant: Power Idea Technology (Shenzhen) Co., Ltd., Shenzhen (CN)

(72) Inventors: Fan-Guo Chen, Shenzhen (CN); Dong-Ming Chen, Shenzhen (CN)

(73) Assignee: Power Idea Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 15/376,667

(22) Filed: Dec. 13, 2016

(65) Prior Publication Data

US 2017/0154741 A1    Jun. 1, 2017

Related U.S. Application Data

(63) Continuation of application No. PCT/CN2014/083098, filed on Jul. 26, 2014.

(51) Int. Cl.
| | | |
|---|---|---|
| H04M 1/00 | (2006.01) |
| H01H 13/06 | (2006.01) |
| H01H 13/14 | (2006.01) |
| H04B 1/3827 | (2015.01) |
| H04M 1/18 | (2006.01) |
| H04B 1/38 | (2015.01) |

(52) U.S. Cl.
CPC ............ *H01H 13/06* (2013.01); *H01H 13/14* (2013.01); *H04B 1/3833* (2013.01); *H04M 1/18* (2013.01); *H04B 2001/3894* (2013.01)

(58) Field of Classification Search
CPC ........ H01H 13/06; H01H 13/14; H04B 1/3833
USPC ......................................... 455/575.1
See application file for complete search history.

(56) References Cited

U.S. PATENT DOCUMENTS

2010/0200456 A1* 8/2010 Parkinson .............. B29C 33/485
                                                                    206/701
2014/0268516 A1* 9/2014 Fathollahi .............. A45C 11/00
                                                                    361/679.01

* cited by examiner

*Primary Examiner* — Ayodeji Ayotunde
(74) *Attorney, Agent, or Firm* — Steven Reiss

(57) ABSTRACT

A waterproof structure for a button includes a casing, a button, and an elastic member. The elastic member is arranged on the casing and is contacted by the elastic member. The elastic member is integrated with the casing. The elastic member includes a tubular structure arranging an arc-shaped structure protruding towards interior of the tubular structure. The elastic wall allows a range of elastic travel to activate the switch under the button. The elastic member is a built-in component.

16 Claims, 8 Drawing Sheets

WATERPROOF STRUCTURE FOR BUTTON OF ELECTRONIC PRODUCT AND WATERPROOF MOBILE PHONE USING THE SAME

FIELD

The subject matter herein generally relates to a waterproof structure for a button of an electronic product used outdoors, and a waterproof mobile phone using the same.

BACKGROUND

Electronic products need to be able to withstand a variety of environments. Conventional waterproofing for a button arranged on a sidewall of an outdoor mobile phone is shown in FIG. 1 and FIG. 2; the waterproof structure includes a casing 100, a button 200, a silicone member 300, and a button switch 400. The casing is a double-color molded product. An outer surface of the casing is provided with a soft rubber layer 101. The material of the button 200 is the same as the material of the soft rubber layer 101. The button 200 and the soft rubber layer 101 are an integrated structure, and the button 200 and the casing 100 are integrated molded, thus the sealing and waterproofing of the button 200 can be assured. The button 200 protrudes out of a surface of the soft rubber layer 101. The protrusion portion of the button 200 is of an arch structure 201. A protruding height that the arch structure 201 protrudes from the soft rubber layer 101 provides a range of elastic travel for the button 200. Considering that the button 200 is prominent on the mobile phone, the protruding height cannot be set to be too high, otherwise the whole appearance of the product will be influenced. The silicone member 300 is assembled to the casing 1. A protrusion 301 is provided on a side of the silicone member 300 facing the button 200. The protrusion 301 contacts the arch structure 201. The silicone member 300 is provided with a convex housing 302 at another side of the silicone member 300 opposite to the protrusion 301. The button switch 400 is assembled and fixed to the casing 1. The button switch 400 faces the convex housing 302, and the button switch 400 and the convex housing 302 press against each other. When the button 200 is pressed, because of the arch structure 201 being made of soft material and a certain elastic travel allowed by the arch shape of the arch structure 201, a deformation is generated when being pressed. The deformation further acts on the silicone member 300, causing the silicone member to generate a displacement at a direction of the pressing, thus the button switch is activated and a corresponding function is triggered. In the aforementioned waterproof structure for a button, because of a limit of the protrusion height that the arch structure 201 protrudes from the soft rubber layer 101, only a small range of elastic travel is provided. Not only does this impart a bad feel when using the button 200, but also the button 200 cannot be activated if the range of elastic travel is not enough. Moreover, because the button 200 and the soft rubber layer 101 are an integrated structure, and the button 200 and the casing 100 are integrally molded, the button 200 needs to be visibly suitable for the soft rubber layer 101 in the material and the color, therefore the color of the outer surface of the product is monotonous, lacking design flexibility.

SUMMARY OF THE INVENTION

The problem to be solved by the present disclosure is to provide a waterproof structure for a button. The structure can resolve the problem of related art that a bad feel of the button and the function of not being activated, brought about by the insufficiency of the range of elastic travel because of the limited integration between the button and the casing.

A waterproof structure for a button comprises a casing, a button, and an elastic member. The elastic member is arranged on the casing. The button is movably coupled to the casing and contacts the elastic member. The elastic member and the casing are integrated. The elastic member includes a tubular structure. An elastic wall is arranged on the tubular structure. The elastic wall is of an arch structure. The elastic wall protrudes towards an interior of the tubular structure.

A waterproof mobile phone using the waterproof structure for the button is also presented.

The present disclosure brings about the following beneficial effects: in the waterproof structure for the button of the present disclosure, the elastic member is arranged on the casing and is integrated with the casing. Reliable waterproofing of the button is ensured. Simultaneously, an elastic wall which is of an arch structure is arranged on the elastic member. The arch height of the arch structure provides a range of elastic travel which is sufficient for activating the switch. The elastic member of this disclosure is a built-in component of the product. Thus, the arch height of the arch structure can be flexibly varied and adjusted according to the actual needs, and accordingly provides a sufficient travel range for the activation of the button function. Problems of non-activation and a less than optimal user feel of the button in related art are both resolved.

Moreover, the button being an independent component, the material and the color of the button can be flexibly adjusted according to the customer requirements and the product requirements, the flexibility of the entire design of the product is thus improved.

BRIEF DESCRIPTION OF THE DRAWINGS

Implementations of the present technology will now be described, by way of example only, with reference to the attached figures, wherein.

DETAILED DESCRIPTION

The present disclosure and mobile phone are to be understood in conjunction with the accompanying drawings and specific embodiments herein.

Figure 1:
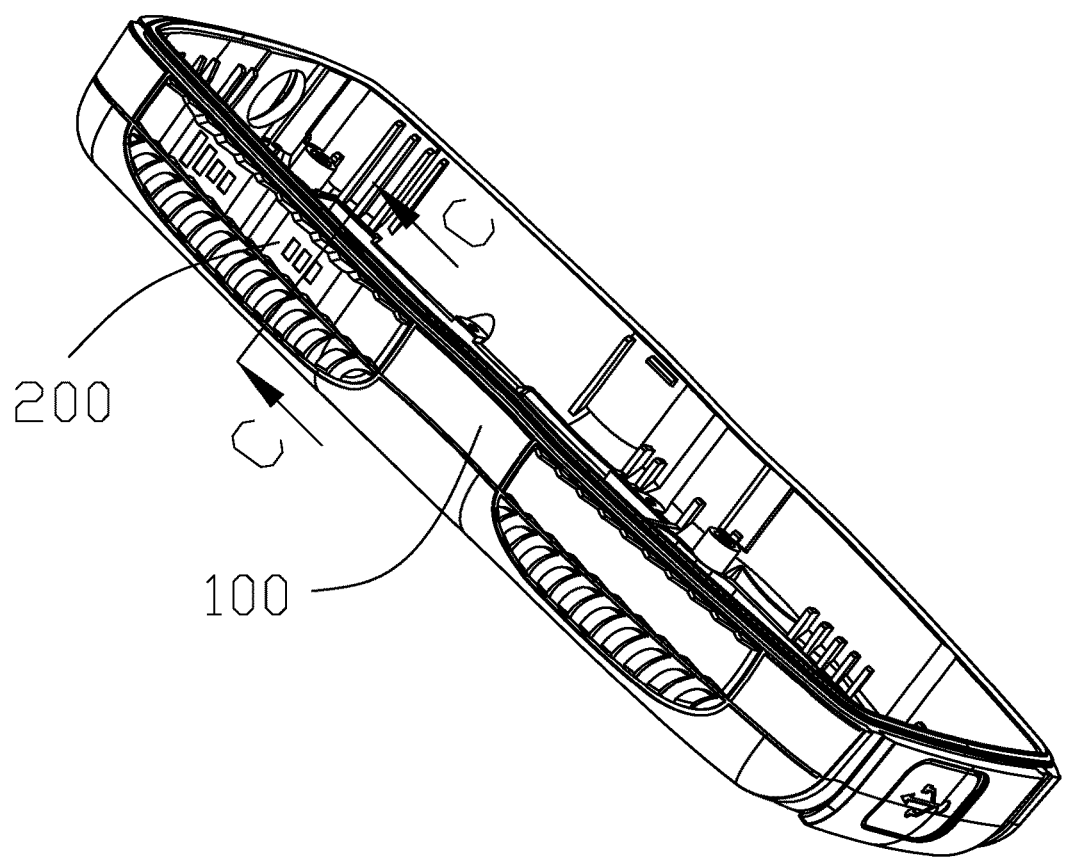
FIG. 1 illustrates an assembled view of a waterproof structure for a button of related art.
Figure 2:
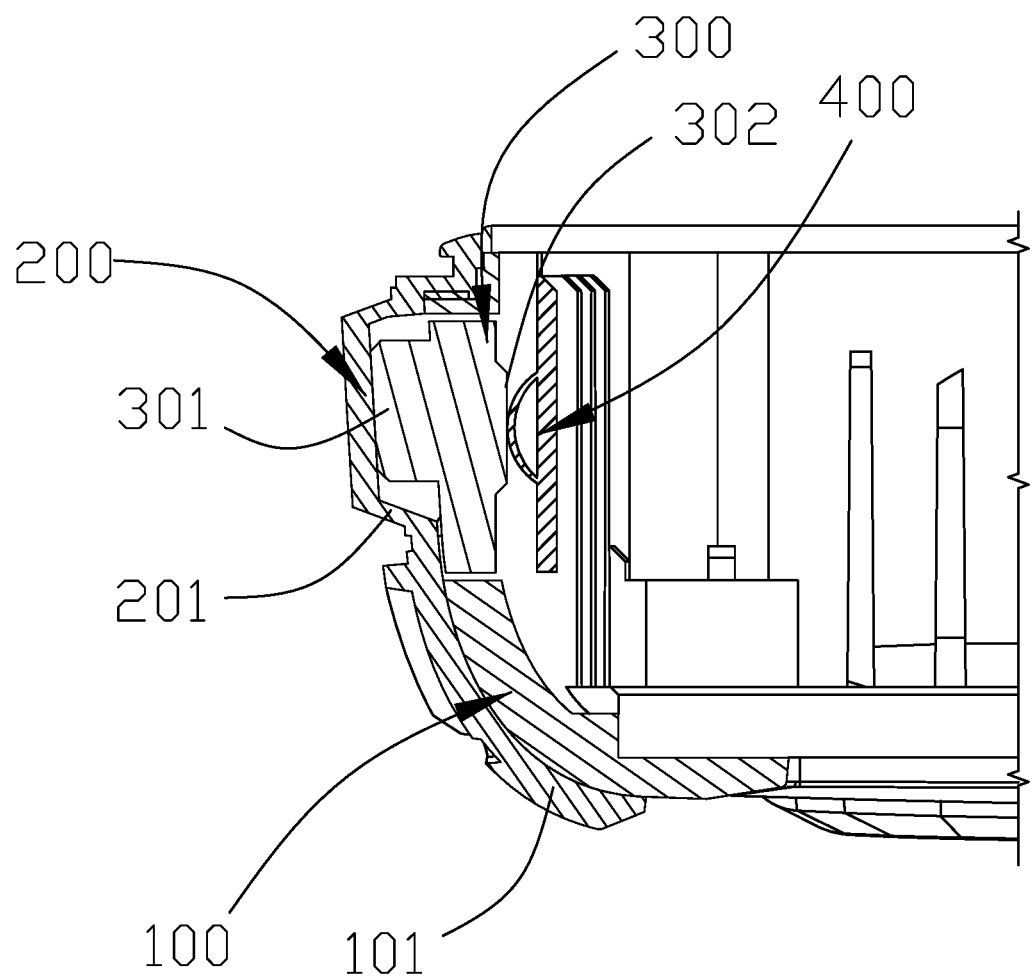
FIG. 2 illustrates an enlarged and cross-section view of the button of related art taken along line C-C of FIG. 1.
Figure 3:
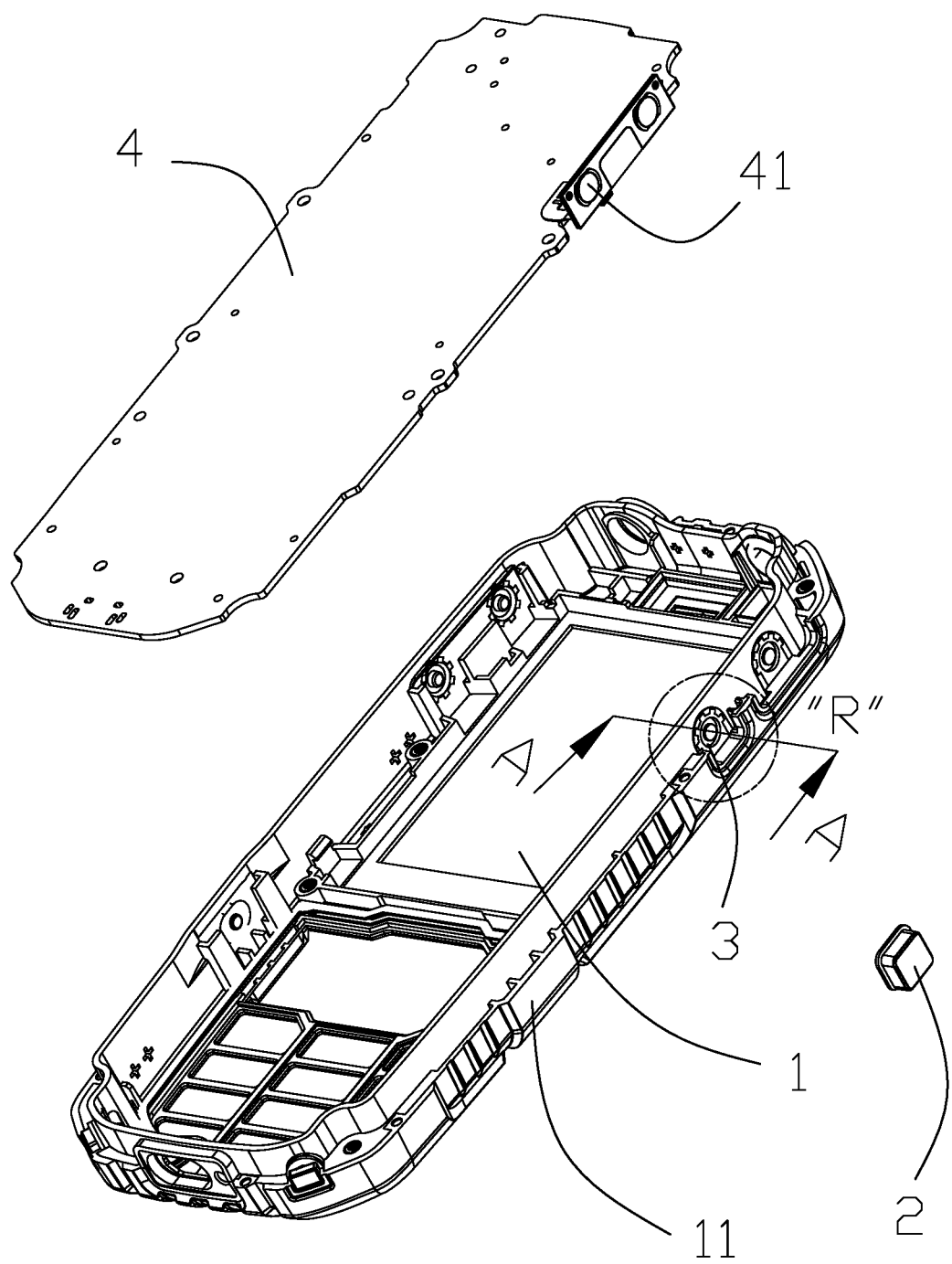
FIG. 3 illustrates an exploded view of an embodiment of a waterproof mobile phone.
Figure 4:
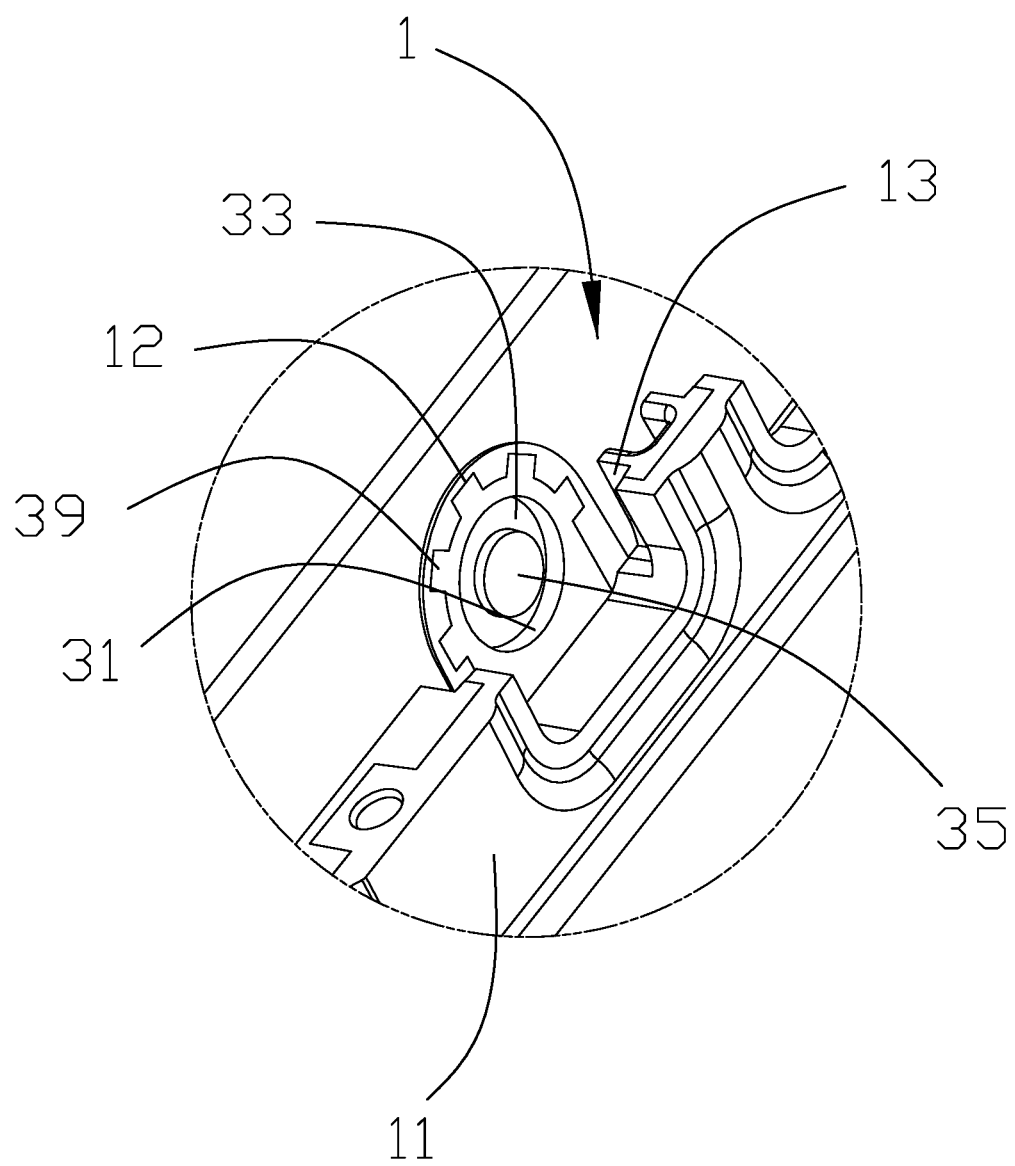
FIG. 4 illustrates an enlarged view of a portion "R" of the mobile phone of FIG. 3.
Figure 5:
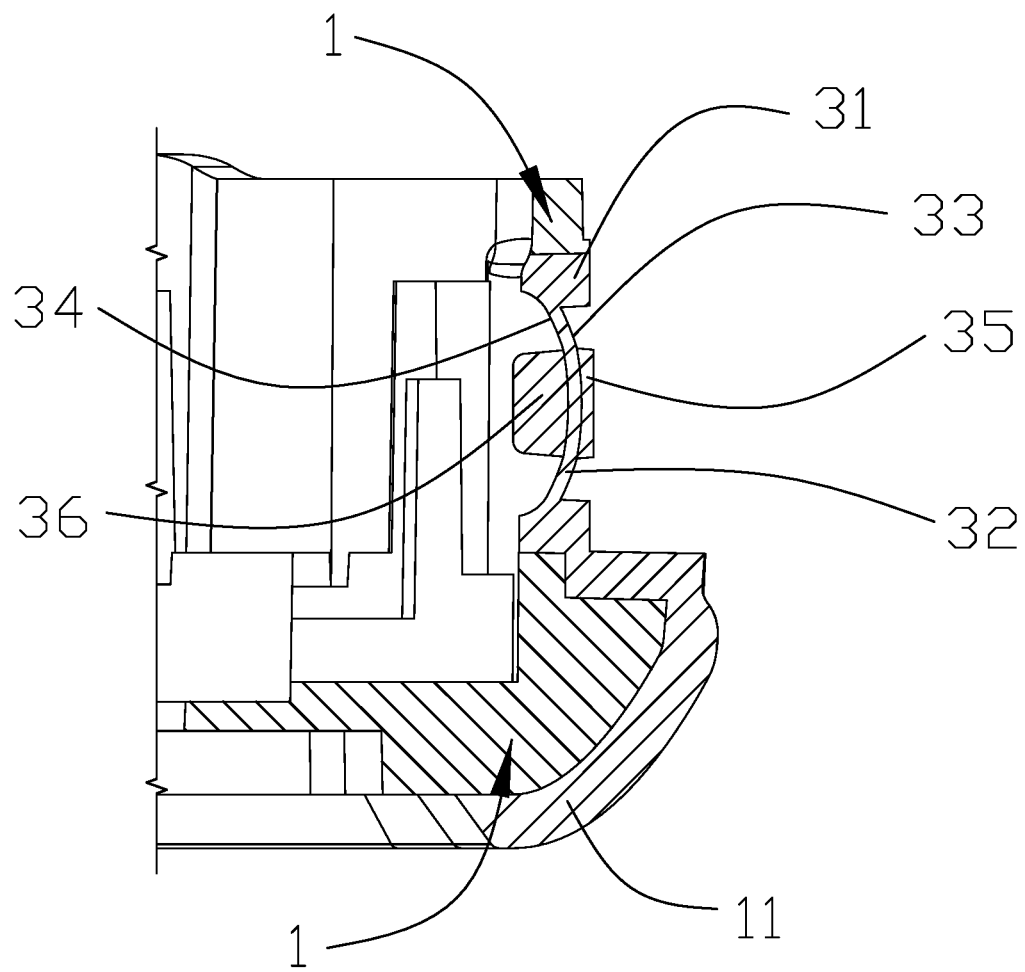
FIG. 5 illustrates an enlarged and cross-section view taken along line A-A of FIG. 3.
Figure 6:
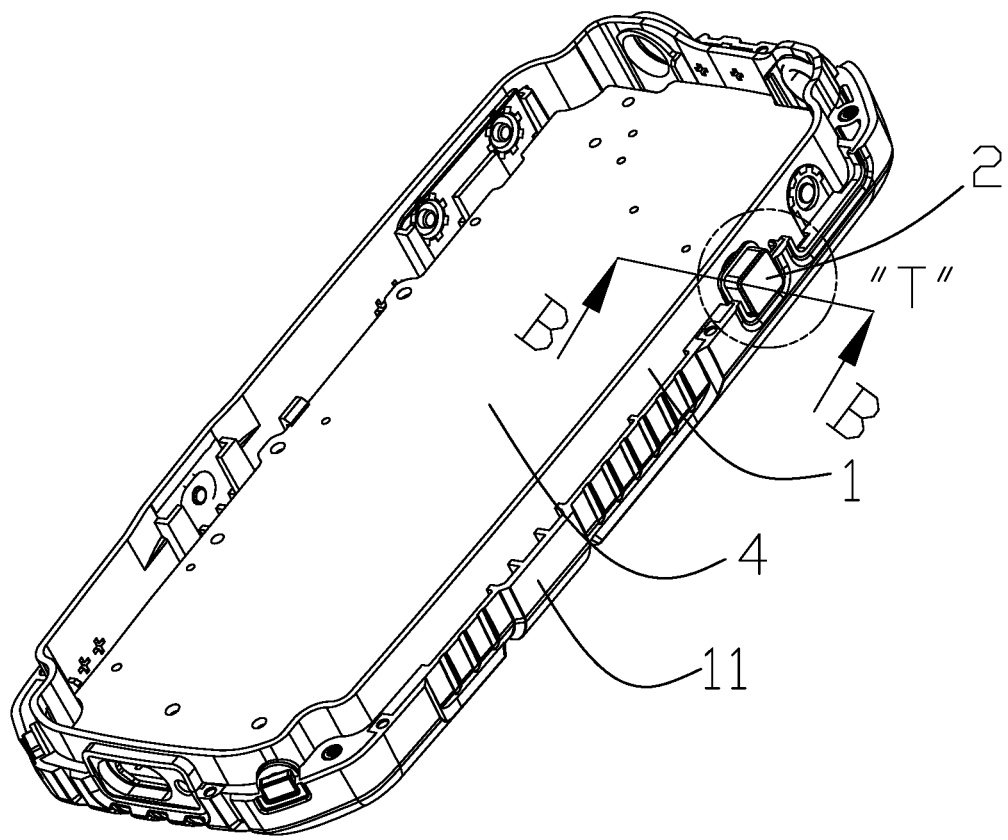
FIG. 6 illustrates an assembled view of an embodiment of a waterproof mobile phone.
Figure 7:
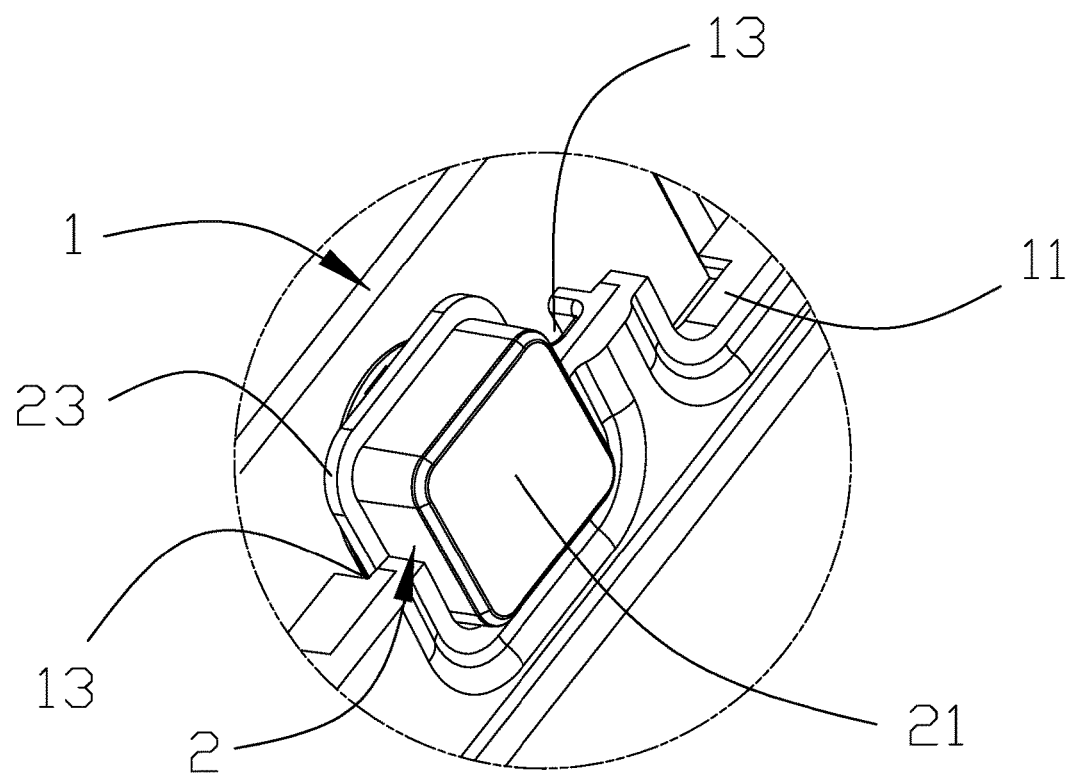
FIG. 7 illustrates an enlarged view of a portion "T" of the assembled mobile phone of FIG. 6.
Figure 8:
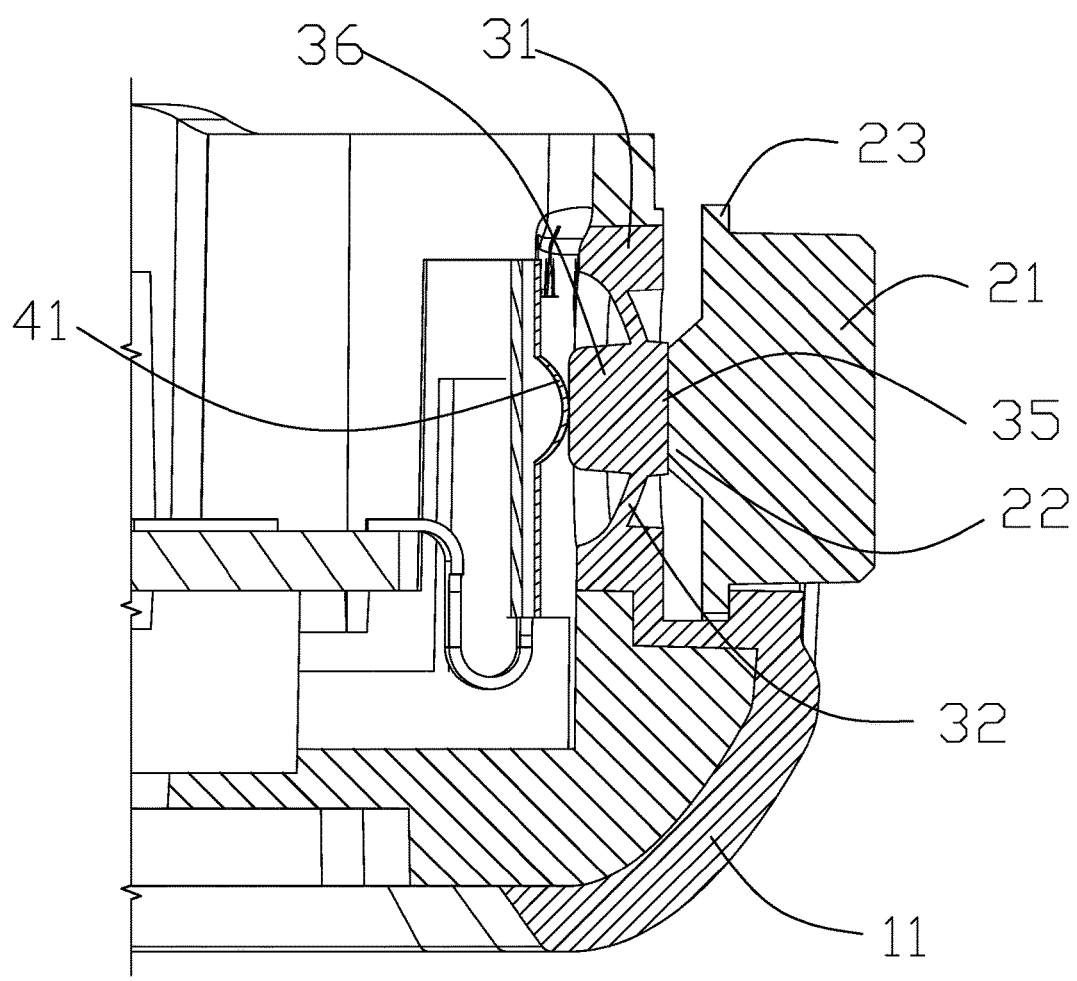
FIG. 8 illustrates an enlarged and cross-section view taken along line B-B of the assembled mobile phone of FIG. 6.

Referring to FIG. 3 and FIG. 6, a waterproof structure for a button of an outdoor waterproof mobile phone is shown. The waterproof structure includes a casing 1, a button 2, an elastic member 3, and a printed circuit board (PCB) 4. The PCB 4 is coupled to a button switch 41. The PCB 4 is assembled in the casing 1. An outer surface of the casing 1 is provided with a soft rubber layer 11. The soft rubber layer 11 and the casing 1 are integrally molded. Referring to FIGS. 4-8, the material of the elastic member 3 is the same as the material of the soft rubber layer 11, and the elastic member 3 and the soft rubber layer 11 are an integrated structure. The elastic member 3 is integrated with the casing 1. The elastic member 3 includes a tubular structure 31. An elastic wall 32 is arranged on the tubular structure 31. The elastic wall 32 is of an arched structure. The elastic wall 32 protrudes towards an interior of the tubular structure 31. The elastic wall 32 includes an inner bottom surface 33 and an outer bottom surface 34. A center of the inner bottom surface 33 is further provided with a convex stage 35. The outer bottom surface 34 is further provided with a protrusion 36 corresponding to the convex stage 35. The protrusion 36 is opposite to the button switch 41. The protrusion 36 and the button switch 41 can contact and press against each other. An outer sidewall of the tubular structure 31 is further provided with a sawtooth structure 39. In at least one embodiment, there are five sawteeth in the sawtooth structure 39. The casing 1 is provided with sawtooth grooves 12 corresponding to the sawtooth structure 39. The elastic member 3 is tightly engaged with and integrated with the casing 1 via an engagement between the sawtooth structure 39 and the sawtooth grooves 12. The button 2 includes a keycap 21 and a resisting block 22. There is a flange 23 at the lower periphery of the keycap 21. The casing 1 is provided with a button engaging groove 13 corresponding to the flange 23. A width of the engaging groove 13 is greater than a thickness of the flange 23 at a thickness direction of the flange 23, allowing some vertical movement by the keycap 21. Thus, the flange 23 is movably assembled in the engaging groove 13 to achieve a required range of movement of the button 2, and the engaging groove 13 presents a limit to the movement of the button 2. Simultaneously, the resisting block 22 is opposite to the convex stage 35 and the resisting block 22 and the convex stage 35 are in contact with each other. When the button 2 is pressed, the resisting block 22 applies pressure on the convex stage 35. At that moment, the elastic wall 32 is stretched and deformed, the pressure being transmitted to the button switch 41 via the protrusion 36. Thereby the button switch 41 is activated and the function of the button 2 is accordingly achieved.

In the aforementioned waterproof structure, the elastic wall 32 and the casing 1 are integrally molded, thus waterproofing of the button 2 is ensured. Simultaneously, the height of the arch of the arch-shaped elastic wall 32 determines a stretch and deformation length of the elastic wall 32, that is, the arch height determines range of elastic travel. The elastic wall 32 is an internal structure of the product. Thus the nature and shape of the casing in relation to the arch height design is almost irrelevant and the arch height design can be flexibly adjusted according to the desirable range of travel to activate the button switch 41. Design of the range of elastic travel has no bearing on cosmetic appearance and the problem of low user satisfaction in using the button 2 (caused by a small elastic travel range) is resolved. The color and the material of the button 2 can be independently and flexibly designed according to the customer requirement and the product requirement. Moreover, the elastic member 3 and the soft rubber layer 11 of the casing 1 employ a tooth-engagement manner of assembly. Simultaneously, the elastic member 3 and the soft rubber layer 11 are coupled as an integrated structure, thus the engagement between the elastic member 3 and the casing 1 is tight, and disengagement between the elastic member 3 and the casing 1 because of repeated deformations of the elastic member 3 caused by repeated presses is avoided. Waterproofing of the button 2 and effective triggering of a desired function is more reliable.

The elastic member 3 can also be a sole structure and can be coupled with the casing 1 to be an integrated structure via mutual engagement between the sawtooth structure 39 on the elastic member 3 and the sawtooth grooves 12 on the casing 1. Other manners of coupling can be employed and the shape of the sawteeth can be varied, provided only that the coupling between the elastic member 3 and the structure is close and tight. Simultaneously, the elastic member 3 can be adapted to the double-color molded casing 1. The elastic member 3 and the soft rubber layer 11 can be made as an integrated structure, a button function and a reliable waterproofing can be better achieved. The arch structure can be designed as round, or as an arched surface with trapezoidal cross section, or as other shape. The elastic member 3 must provide a preset range of elastic travel, and the function of the switch acted on by the elastic member 3 must be achieved via the stretch and rebound of the arch surface, all such arrangments fall inside the range of protection of this disclosure.

The above is a detailed description with drawings of a waterproof structure for a button with an arched structure elastic wall. However, the ideas of the present disclosure can be developed to all kinds of waterproof structure for a button, and the application field can be developed to all outdoor electronic products. Any situation, such as, the product needs to apply the waterproof structure for the button, improve the feel of the button in addition to the waterproofing, or improve the reliability of the button function, can use the ideas of the present disclosure to change and develop.

What is claimed is:

1. A waterproof structure for a button comprising:
 a casing;
 a button movably coupled to the casing; and
 an elastic member arranged on the casing and integrated with the casing, the elastic member being contacted by the button, the elastic member comprising a tubular structure and an elastic wall, the elastic wall being arranged on the tubular structure, the elastic wall being of an arched structure and protruding towards interior of the tubular structure.

2. The waterproof structure for a button as described in claim 1, wherein:
 the arch structure comprises an inner bottom surface and an outer bottom surface, a center of the inner bottom surface is provided with a convex stage, the outer bottom surface is provided with a protrusion corresponding to the convex stage.

3. The waterproof structure for a button as described in claim 2, wherein:
 the button comprises a keycap and a resisting block, the resisting block is assembled in the tubular structure and contacts the convex stage.

4. The waterproof structure for a button as described in claim 3, wherein:
 an outer sidewall of the tubular structure is provided with a sawtooth structure, the number of sawteeth of the sawtooth structure is no less than two, the casing is provided with a plurality of sawtooth grooves corresponding to the sawtooth structure, the elastic member is engaged with and integrated with the casing via an engagement between the sawteeth and the sawtooth grooves.

5. The waterproof structure for a button as described in claim 4, wherein:
an outer surface of the casing is provided with a soft rubber layer, the soft rubber layer and the casing are integrated, the material of the soft rubber layer is the same as the material of the elastic member, and the elastic member couples with the soft rubber layer to be a whole via an area of an outer sidewall of the elastic member other than another area of the outer sidewall providing with the sawtooth structure.

6. The waterproof structure for a button as described in claim 5, wherein:
the elastic member and the soft rubber layer are an integrated structure, and the elastic member and the casing are integrally molded.

7. The waterproof structure for a button as described in claim 6, wherein:
the number of the sawteeth and the number of the sawteeth grooves are respectively five, the sawteeth are evenly distributed on the outer sidewall of the elastic member and are further positioned at the another area of the outer sidewall excluding the area coupled with the soft rubber layer.

8. The waterproof structure for a button as described in claim 7, wherein:
an outer edge of the keycap is provided with a flange, the casing is provided with a button engaging groove corresponding to the flange, a width of the engaging groove is greater than a thickness of the flange at a direction of a thickness of the flange, therefore the button is movably assembled in the engaging groove.

9. A waterproof mobile phone comprising:
a waterproof structure for a button comprising:
a casing;
a button movably coupled to the casing; and
an elastic member arranged on the casing and integrated with the casing, the elastic member being contacted by the button, the elastic member comprising a tubular structure and an elastic wall, the elastic wall being arranged on the tubular structure, the elastic wall being of an arch structure, the elastic wall protruding towards interior of the tubular structure.

10. The waterproof mobile phone as described in claim 9, wherein:
the arch structure comprises an inner bottom surface and an outer bottom surface, a center of the inner bottom surface is provided with a convex stage, the outer bottom surface is provided with a protrusion corresponding to the convex stage.

11. The waterproof mobile phone as described in claim 10, wherein:
the button comprises a keycap and a resisting block, the resisting block is assembled in the tubular structure and contacts the convex stage.

12. The waterproof mobile phone as described in claim 11, wherein:
an outer sidewall of the tubular structure is provided with a sawtooth structure, the number of sawteeth of the sawtooth structure is no less than two, the casing is provided with a plurality of sawtooth grooves corresponding to the sawtooth structure, the elastic member is engaged with and integrated with the casing via an engagement between the sawteeth and the sawtooth grooves.

13. The waterproof mobile phone as described in claim 12, wherein:
an outer surface of the casing is provided with a soft rubber layer, the soft rubber layer and the casing are integrated, the material of the soft rubber layer is the same as the material of the elastic member, and the elastic member couples with the soft rubber layer to be a whole via an area of an outer sidewall of the elastic member other than another area of the outer sidewall providing with the sawtooth structure.

14. The waterproof mobile phone as described in claim 13, wherein:
the elastic member and the soft rubber layer are an integrated structure, and the elastic member and the casing are integrally molded.

15. The waterproof mobile phone as described in claim 14, wherein:
the number of the sawteeth and the number of the sawteeth grooves are respectively five, the sawteeth are evenly distributed on the outer sidewall of the elastic member and are further positioned at the another area of the outer sidewall excluding the area coupled with the soft rubber layer.

16. The waterproof structure for a button as described in claim 15, wherein:
an outer edge of the keycap is provided with a flange, the casing is provided with a button engaging groove corresponding to the flange, a width of the engaging groove is greater than a thickness of the flange at a direction of a thickness of the flange, therefore the button is movably assembled in the engaging groove.

* * * * *